United States Patent [19]

Hwang

[11] Patent Number: 5,168,751
[45] Date of Patent: Dec. 8, 1992

[54] DIGITAL TIRE PRESSURE GAUGE

[76] Inventor: Raymond Hwang, No. 35, Sec. 4, Ting Tsao Rd., Lu Kang, Chang Huah, Taiwan

[21] Appl. No.: 738,975

[22] Filed: Aug. 1, 1991

[51] Int. Cl.$^5$ .................... B60C 23/04; G01L 7/16; G01L 9/02
[52] U.S. Cl. ........................................ 73/146.8; 73/746
[58] Field of Search .................. 73/146.8, 746, 745, 73/115

[56] References Cited

U.S. PATENT DOCUMENTS

| | | | |
|---|---|---|---|
| 4,250,759 | 2/1981 | Vago et al. | 73/723 |
| 4,333,491 | 6/1982 | Knubley | 73/146.8 |
| 4,704,901 | 11/1987 | Rocco et al. | 73/146.8 |
| 4,728,920 | 3/1988 | McKee et al. | 73/746 |
| 4,998,438 | 3/1991 | Martin | 73/146.8 |

Primary Examiner—Donald O. Woodiel
Attorney, Agent, or Firm—Browdy and Neimark

[57] ABSTRACT

A digital tire pressure gauge comprises a pressure measuring head to introduce thereinto the tire air. The pressure measuring head extends axially to form a tubular body in which a pressure bearing rod encased by a coil spring is received. The pressure bearing rod is coupled with a pressure converting unit serving to convert the displacement distance of pressure bearing rod into an electronic signal. A pressure displaying unit is connected with the output terminal of the pressure converting unit so as to exhibit thereon in digital form the electronic signal transmitted from the pressure converting unit.

6 Claims, 3 Drawing Sheets

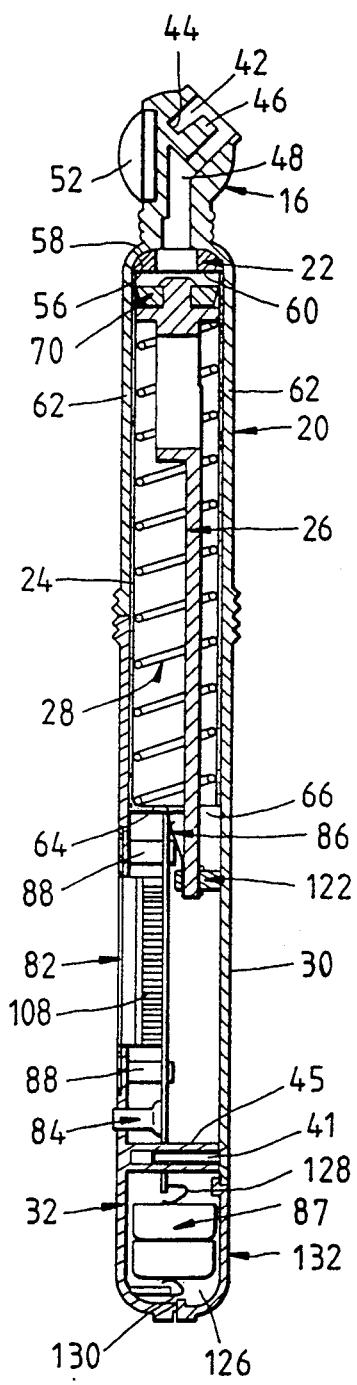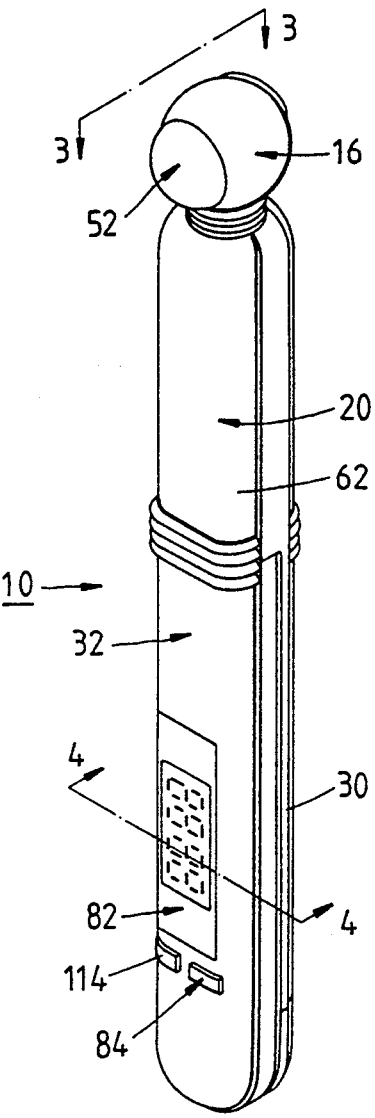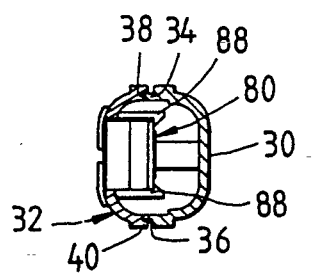
FIG. 3
FIG. 1
FIG. 4

DIGITAL TIRE PRESSURE GAUGE

BACKGROUND OF THE INVENTION

The present invention relates to a tire pressure measuring gauge, and more particularly to a digital tire pressure gauge.

The conventional tire pressure gauge of prior art is generally designed in such manners that the amount of air pressure of the measured tire is represented by the displacement of the spring of the gauge, which corresponds to the elasticity of the gauge spring, reaching an equilibrium with the air pressure existing in the measured tire, and that it is provided with scale and markings for convenience of the user thereof to take the reading of the air pressure. The gauge as such is defective in design in that it often fails to provide the user with a luxury of precise measurement of the air pressure as well as easy reading of the measured air pressure. Therefore, a digital tire pressure gauge equipped with a pressure convertor comprising therein the diaphragm of semi-conductive nature was introduced; nevertheless it is susceptible to external factors such as temperature, humidity, oil vapor, etc. But for the most part, it is the pressure converter of the gauge which is too expensive to be used on a commercial basis.

SUMMARY OF THE INVENTION.

It is therefore the primary objective of the present invention to provide a digital tire pressure gauge with a pressure converter immune from the surrounding environmental factors.

It is another primary objective of the present invention to provide a digital tire pressure gauge, which can be made at a relatively low cost.

In keeping with principles of the present invention, the primary objectives of the present invention are accomplished by a digital tire pressure gauge comprising a pressure detecting device capable of perceiving the air pressure of the tire through the tire inflation valve and a pressure converting and displaying device cooperating with the pressure detecting device in such a manner that it is able to convert and display the detected air pressure. The pressure detecting device is characterized in that it is composed of a pressure measuring means intended to make contact with the tire inflation valve to permit the entry of tire air pressure into the detecting device, and that it also consists of a pressure bearing means arranged under the pressure measuring member in such ways that an entry of the tire air pressure causes the displacement of the pressure bearing means and that the dissipation of the introduced air pressure induces the displaced pressure bearing means to return to its original position. The pressure converting and displaying device is provided with a pressure converting unit capable of sensing the distance of displacement of the pressure bearing means and capable of translating the sensed displacement distance into an electronic signal. In addition, the pressure converting and displaying device consists of a pressure displaying unit capable of sensing and exhibiting the electronic signal emitted by the pressure converting unit.

The pressure measuring means of the tire pressure gauge embodied in the present invention comprises a pressure measuring head with a recess mouth located at one end thereof and with a protruded pillar extending outwardly from the bottom portion of the recess mouth and further with an air duct passing therethrough, and further comprises a tubular body which couples with the pressure measuring head at one end therof and communicates with the air duct. The other end of tubular body is provided with a baffle and an opening adjacent to the baffle. The pressure bearing means of the present invention is composed of a pressure bearing rod received in the tubular body in such a manner that one end of pressure bearing rod is permitted to extend outwardly from the opening of the tubular body and that other end of pressure bearing rod is fastened to a sealing gasket. The pressure bearing means further comprises a coil spring urging against the sealing gasket at one end thereof and the baffle of the tubular body at other end thereof. The pressure converting unit consists of a base plate coupled with the opening end of the tubular body. The base plate comprises an integrated circuit containing a plurality of output and input terminals, with one of the output terminals being coupled with the pressure displaying unit. The base plate further comprises a linear resistor with both ends thereof being connected respectively with one input terminal and one output terminal of the integrated circuit. A conducting piece is fastened to the end of pressure bearing rod which extends beyond the opening of the tubular body. The first contact portion of the conducting piece is coupled with the input terminal of the linear resistor while the second contact portion of the conducting piece is connected with the body portion of the linear resistor. The input terminal of pressure displaying unit, which may be a LCD display, is coupled with one output terminal of integrated circuit.

When taking air pressure of the tire with the gauge of the present invention, the protruded pillar of pressure measuring head is pressed against the mouth of tire inflation valve so as to permit the air inside the tire to flow via the air duct of the pressure measuring head into the tubular body in which the intruded air forces against the pressure bearing rod and the coil spring. As soon as elasticity of the coil spring and the tire pressure have reached an equilibrium, the displacement of pressure bearing rod ceases. Thereafter, the displacement of pressure bearing rod is converted into a predetermined resistance value, which is then picked up by the integrated circuit and is automatically converted into a digital signal to be shown on the LCD display. When the pressure measuring head of the gauge is removed from the tire inflation valve, the coil spring will return, in conjunction with the pressure bearing rod, to its original position. However, the measured air pressure is retained and shown on the LCD display, thanks to the memory of the integrated circuit.

BRIEF DESCRIPTION OF THE DRAWINGS

FIG. 1 shows a three-dimensional view of the preferred embodiment of the present invention.

FIG. 3 shows a sectional view of the preferred embodiment taken along the line 3—3 as shown in FIG. 1.

FIG. 4 shows a sectional view of a portion taken along the line 4—4 as shown in FIG. 1.

DETAILED DESCRIPTION OF THE PREFERRED EMBODIMENT

Figure 2:
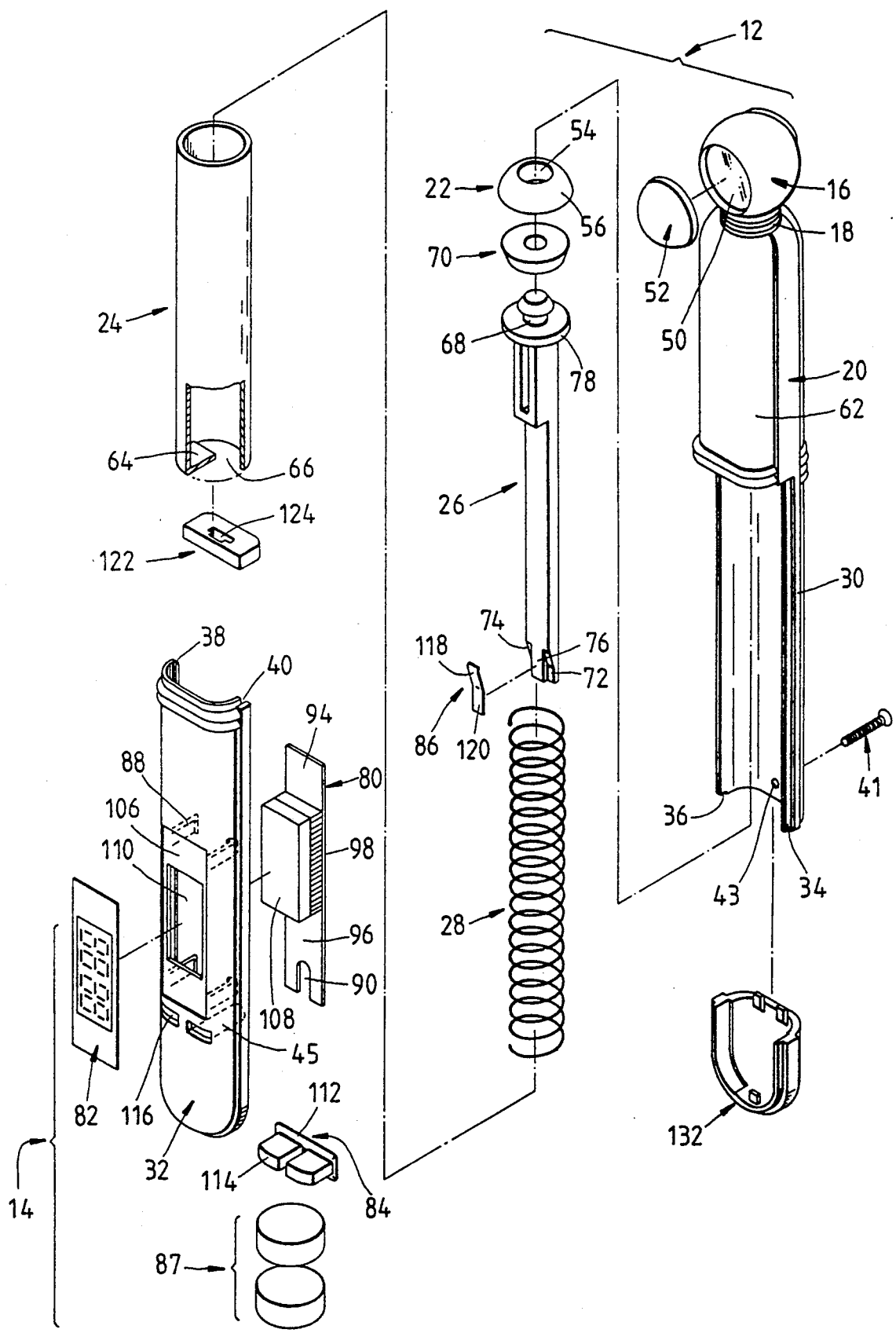
FIG. 2 shows an exploded view of the preferred embodiment of the present invention.

Referring to all drawings provided herein, the digital tire pressure gauge 10 embodied in the present invention is shown comprising a pressure detecting device 12 and a pressure converting and displaying device 14.

The pressure detecting device 12 is provided with a pressure measuring head 16 and a main body 20 extending downwardly from the neck portion 18 of the pressure measuring head 16. The main body 20 is composed of a fixed cushion 22 and a tubular body 24 which in turn comprises therein a pressure bearing rod 26 and a coil spring 28 encasing the pressure bearing rod 26.

The main body 20 is rectangular in its cross section, with lower section 30 thereof being protected by a case body 32 of corresponding size. The open end of the lower section 30 comprises guide rails 34 and 36 arranged respectively at both sides thereof. The case body 32 is composed of two guide grooves 38 and 40 positioned correspondingly to guide rails 34 and 36 of the lower section 30 to facilitate an easy assembly of case body 32 and lower section 30. In addition, a screw bolt 41 traverses a screw hole 43 located at the end portion of lower section 30 to engage with a screw column 45 of the case body 32 so as to ensure that case body 32 and lower section 30 stay together in place.

The presssure measuring head 16 is provided with a recess mouth 42, a protruded pillar 46 extending upwardly from the bottom 44 of the recess mouth 42, and an air duct 48 passing through the body therof. For the purpose of making the pressure measuring head 16 easy to use, it is additionally provided with a circular recess 50 located at one end of the recess mouth 42, into which a semi-circular press cushion 52 made of a soft material is inserted.

The fixed cushion 22 is of a semi-circular construction and is composed of a centrally located perforation 54, an upper surface 56 of a semi-circular construction engaging with the inner cambered surface 58 located at the junction of the main body 20 and the neck portion 18 of the pressure measuring head 16, and a circular bottom surface 60 making contact with the upper end surface of the tubular body 24.

The tubular body 24 is slightly shorter in length than the closed upper section 62 of the main body 20 so that the former can be completely enclosed in the latter. The upper end portion of the tubular body 24, which makes contact with the fixed cushion 22, is open while the other end portion thereof is provided with a semi-circular baffle 64 and a semi-circular opening 66 adjacent to the baffle 64.

The pressure bearing rod 26 comprises at one end thereof a ring slot 68, which is constructed integrally as a part of unitary body of the pressure bearing rod 26 to facilitate a ring-shaped sealing gasket 70 to be inserted thereinto. The other end of the pressure bearing rod 26 extends beyond the opening 66 of the tubular body 24 and comprises two cut portions 72 and 74 and a flat portion 76 located between the two cut portions 72 and 74.

The coil spring 28 urges at one end thereof against the flange 78 of the pressure bearing rod 26 and at other end thereof against the baffle 64 of the tubular body 24.

Figure 5:
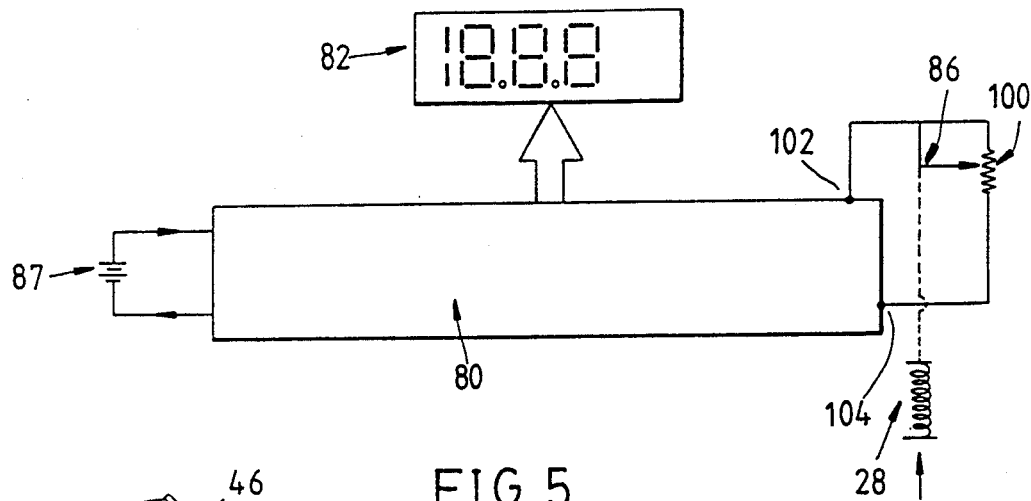
FIG. 5 shows a schematic view of the connection of integrated circuit to the linear resistor according to the present invention.
Figure 6:
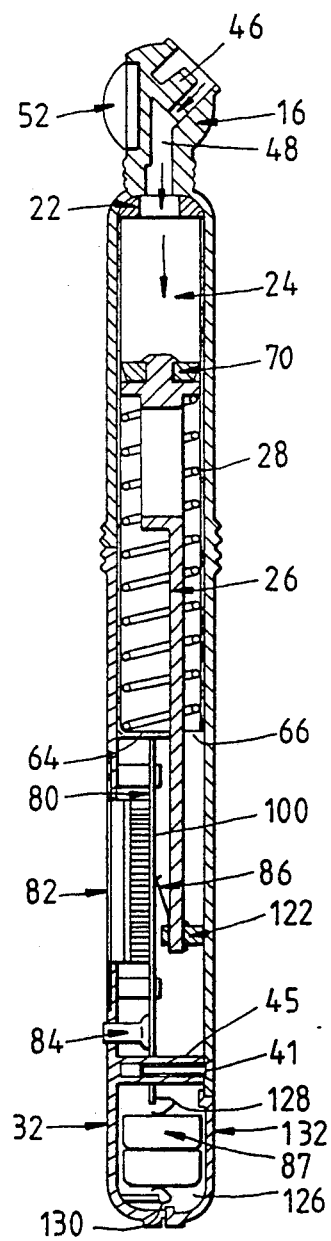
FIG. 6 shows a sectional and schematic view of the preferred embodiment being used to take the tire pressure according to the present invention.

The pressure converting and displaying device 14 is composed of a base plate 80, a LCD display 82, a switch set 84, a conducting piece 86, and a pair of batteries 87. The base plate 80 of rectangular construction is suspended inside the interior of the main body 20 by means of two hook arms 88 extending downwardly from the inner wall surface of the case body 32. Located at one end of the base plate 80 is an indentation 90 to receive the screw column 45. An integrated circuit 96 formed on the upside 94 of the base plate 80 contains a plurality of output and input terminals for use in controlling the switch of the power source, reset and conversion of the unit, and carrying out the conversion of a resistance value into a digital signal. Located on the underside 98 of the base plate 80 are linear resistor 100 arranged along the direction of long axis of base plate 80, and input and output terminals 102 and 104 connected respectively with one of output terminals and one of input terminals of the integrated circuit 96, as shown in FIG. 5.

The LCD display 82 is lodged in the rectangular recess 106 of the case body 32. An output terminal of the integrated circuit 96 is coupled with a conducting rubber 108 located on the upside 94 of the base plate 80. The conducting rubber 108 is in turn coupled with the input terminal of the LCD display 82 via a window 110 located at the central portion of the recess 106.

The switch set 84, made of conducting rubber, is provided with a flat plate terminal 112 connecting with the input terminal of the integrated circuit 96 and with a pair of rectangular press terminals 114 which are put through and beyond two through holes 116 of the case body 32 for the user of the gauge to press to select the pressure measuring unit and function as required.

The conducting piece 86 comprises a base portion 120 having a bent portion 118 extending upwardly and obliquely therefrom. The conducting piece 86 is held on to the end portion of the pressure bearing rod 26 by means of a retaining seat 122 having a bore 124 positioned and shaped correspondingly to the end of the pressure bearing rod 26. The conducting piece 86 is embedded between the bore 124 and the flat portion 76 by means of the base portion 120 so that the bent portion 118 can be connected across the input terminal 102 and the body portion of the linear resistor 100.

A battery cell 126 is formed at the ends of case body 32 and lower section 30 of the main body 20 and is composed of a positive conducting piece 128 connecting with the power source input terminal of the integrated circuit 96 and of a negative conducting piece 130 linking with the power source output terminal of the integrated circuit 96. A pair of batteries 87 are kept in place in the battery cell 126, with their output and input terminals being connected respectively with positive and negative conducting pieces 128 and 130. In addition, the battery cell 126 is provided with a cover plate 132 to facilitate the installation and the removal of batteries 87.

In the course of using the gauge 10 of the present invention to measure the tire pressure, the pressure measuring head 16 is first placed against the tire inflation valve in such a manner that the pillar 46 of the pressure measuring head 16 presses the mouth of the tire inflation valve so as to permit the air in the tire to flow via air duct 48 into the tubular body 24 in which the intruded air forces onward the sealing gasket 70, thereby resulting in the displacement of the pressure bearing rod 26 in conjunction with the coil spring 28 toward the opening 66 of the tubular body 24. As soon as elasticity of the coil spring 28 and the tire pressure have reached the state of equilibrium, the displacement of pressure measuring rod 26 ceases. Thereafter, the displacement of pressure measuring rod 26 is converted into a resistance value by the linear resistor 100. The resistance value so attained is then converted via the operation of the integrated circuit 96 into a digital signal of a predetermined unit, which is subsequently shown on the LCD display 82. When the pressure measuring head 16 is removed from the tire inflation valve, the coil spring will return, in conjunction with the pressure bearing rod 26, to its original position. However, the measured air pressure is retained and shown on the LCD display 82, thanks to the memory of the integrated circuit 96.

The embodiment of the present invention described above is to be considered in all respects as merely an illustration of principles of the present invention. Accordingly, the present invention is to be limited only by the scope of the hereinafter appended claims.

What I claim is:

1. A digital tire pressure gauge comprising:

a pressure measuring head having a recess mouth located at one end thereof, a protruded pillar extending outwardly from the bottom of said recess mouth, and an air duct passing therethrough;

a main body extending from pressure measuring head;

a tubular body incased in the main body and connected at one end thereof with said pressure measuring head in such a manner that its interior communicates with said air duct, said tubular body having a baffle at another end thereof and an opening adjacent to said baffle;

a pressure bearing rod accommodated in said tubular body having one end thereof extending beyond said opening;

a pressure bearing sealing piece fastened on another end of said pressure bearing rod;

a coil spring received in said tubular body and encasing said pressure bearing rod in such a manner that it urges at one end thereof against said pressure bearing rod and at another end thereof against said baffle;

a base plate incased in the main body and connected with the opening end of said tubular body;

an integrated circuit for converting a resistance into a digital signal formed on the upside of said base plate;

a linear resistor located on the underside of said base plate, said linear resistor having both ends connected respectively with one input terminal and one output terminal of said integrated circuit;

a conducting piece fastened to one end of said pressure bearing rod, said conducting piece having a first contact portion coupled with the input terminal of said linear resistor and a second contact portion in sliding engagement with a body portion of said linear resistor;

an LCD display lodged in the wall of said main body, said LCD display having an input terminal communicating with an output terminal of said integrated circuit to receive a digital signal from said integrated circuit and to present a numerical display indicative of tire pressure;

a switch set put through and beyond the wall of said main body, said switch set having a terminal connected with the input terminal of said integrated circuit; and a battery cell formed at the interior of said main body for keeping batteries as a power source, said battery cell having a positive conducting piece connecting with a power source input terminal of said integrated circuit and a negative conducting piece connecting with a power source output terminal of said integrated circuit.

2. A digital tire pressure gauge of claim 1, wherein said main body is rectangular in its cross section and is composed of a closed upper section and an open lower section, said open lower section having an open end with a guide rail respectively at each side thereof, and a case body having two guide grooves positioned correspondingly to said guide rail of said lower section to facilitate an easy assembly of said case body and said lower section.

3. A digital tire pressure gauge of claim 2, wherein two hook arms extend downwardly from the inner wall surface of said case body, said base plate being suspended by said hook arms.

4. A digital tire pressure gauge of claim 1, wherein said LCD display is lodged in a rectangular recess of said case body.

5. A digital tire pressure gauge of claim 4, wherein an output terminal of said integrated circuit is coupled with a conducting rubber located on the upside of said base plate, said conducting rubber is in turn coupled with the input terminal of said LCD display through a window located at the central portion of said recess.

6. A digital tire pressure gauge of claim 1, wherein said conducting piece includes a base portion and a bent portion extending obliquely from said base portion;

said pressure bearing rod having a flat portion located at said one end thereof;

a retaining seat having a bore engaged to said one end of said pressure bearing rod; and wherein said conducting piece is embedded between said bore and said flat portion at said base portion and is slidably engaged to said linear resistor by said bent portion.

* * * * *